United States Patent [19]

Comroe et al.

[11] Patent Number: 5,247,701
[45] Date of Patent: Sep. 21, 1993

[54] ON-SITE/TRUNKING SYSTEM FREQUENCY SHARING

[75] Inventors: Richard A. Comroe, Dundee; Arun Sobti, Wheaton; Paul M. Bocci, Roselle; Robert W. Furtaw, Arlington Heights; Bradley M. Hiben, Glen Ellyn; James A. McDonald, Buffalo Grove, all of Ill.

[73] Assignee: Motorola, Inc., Schaumburg, Ill.
[21] Appl. No.: 546,145
[22] Filed: Jun. 29, 1990
[51] Int. Cl.$^5$ .............................................. H04Q 7/00
[52] U.S. Cl. ................................ 455/33.4; 455/56.1; 379/60
[58] Field of Search ............... 455/33, 34, 56; 379/59, 379/60, 63

[56] References Cited

U.S. PATENT DOCUMENTS

| | | | |
|---|---|---|---|
| 4,144,411 | 3/1979 | Frenkiel | 379/59 |
| 4,932,049 | 6/1990 | Lee | 455/33 |
| 5,040,238 | 8/1991 | Comroe et al. | 455/33 |
| 5,093,925 | 3/1992 | Chanroo | 379/59 |

FOREIGN PATENT DOCUMENTS 8808650 11/1988 World Int. Prop. O. ............ 376/60

Primary Examiner—Reinhard J. Eisenzopf
Assistant Examiner—Christine K. Belzer
Attorney, Agent, or Firm—Jon P. Christensen

[57] ABSTRACT

Shown, herein, is a method of allowing use of small, low-power communication systems within the service coverage area of larger trunked systems. The small, low-power systems are constructed to reuse at least some of the communication resources, also used by the larger system. The large system measures signal strength values of large cell communication units and transfers such values to the small systems. A small system compares the transferred values with a threshold and when the threshold is exceeded, reuses the communication resources under a TDM format within the small system.

8 Claims, 5 Drawing Sheets

ON-SITE/TRUNKING SYSTEM FREQUENCY SHARING

TECHNICAL FIELD

This invention relates generally to the field of communication systems and more specifically to trunked communication systems.

BACKGROUND

Trunked communication systems are known. Such systems typically use a base site including a resource controller and a number of transceivers. The base site then services communication units located within a service coverage area. A number of transceivers are required for the base site to service multiple simultaneous conversations. Since only a limited frequency spectrum is available for mobile communication units the number of simultaneous conversations within a particular service coverage area is mainly limited by the size of the spectrum available. The size of a service coverage area is typically chosen to be as large as possible (to minimize infrastructure complexity and cost).

Communication units desiring service transmit a request for service over a control resource (such as a dedicated control channel comprised of a particular frequency or TDM time slot) reserved for that purpose. The communication unit upon requesting service is granted a communication resource (such as a frequency pair or TDM time slot) for transmitting and receiving communications. The base site then supports the communication transaction through local transceivers.

As the number of communication units has increased trunked systems have become congested. To reduce congestion service coverage areas have been reduced in size. A smaller coverage area provides for reduced numbers of mobile units within a given area and, therefore, less competition for available spectrum. A smaller coverage area also allows transmitting units to reduce transmitted power levels. Reducing the power levels of base sites and communication units allows for the same frequencies to be used by other communication units located in surrounding service coverage areas (geographic re-use) without interference.

While geographic re-use can result in significant increases in efficiency the need for communications between units within widely dispersed groups still exists. A need therefore exists for other means/methodologies for increasing the efficiency of the use of communication resources, while retaining large coverage area trunking system services.

SUMMARY OF THE INVENTION

Pursuant to one embodiment of the invention in a geographic re-use context, trunked communication systems are constructed to operate with smaller, low-power (small-cell) communication systems within the service coverage area of the larger trunked system. The larger trunked system measures a signal quality factor (such as received signal strength) of transmitting mobile communication units operating on communication resources (first set of communication resources) allocated by the trunked system. When the signal quality factor is of a sufficiently high level, the larger system determines that a small-cell system may operate within specific areas of the larger trunked system using at least some common frequencies without interfering with communications within the larger system.

Communication units are normally constructed to operate with transmitted power levels of several watts. Base sites operate using antenna extending to high elevations and at power levels several times higher than the communication units. The small-cell units, on the other hand, will typically operate at power levels of approximately ten milliwatts. As such, a communication unit can be said to be operating at a power level several orders of magnitude above the power level of the small-cell units, but below the power level of the base sites of the larger system.

A base site transmission may potentially interfere with small-cell transmissions anywhere within the coverage area of the base site. Communication units, on the other hand, operate at a lower power level than the base sites with antenna that are relatively close to the ground. Because of the lower power transmitters and antenna orientation, transmissions from communication units seldom reach receivers outside the immediate area of the communication unit. If not for the elevated antenna, it would be difficult for the base sites to receive signals from the communication units.

Because of the relatively shorter range of a communication unit, a small-cell system can operate on the same transmission frequency as a communication unit, both within the large cell trunked system, without interference whenever sufficient geographic separation exists.

In one embodiment, small-cell communication units and base sites transmit and receive on a single frequency which is shared with the larger system. Time division multiplexing can be used to support duplex operation within the small cell-system as well understood in the art.

The limited range of the small-cell system may extend from a few feet to a few hundred feet. Such a small-cell system may be operated far away (far-field) from a larger system base site without significantly interfering with larger system operation.

Near-field operation is possible only when a large cell base site receives a sufficiently strong signal from a mobile unit transmitting on the shared resource. The signal quality limitation protects larger system operation when environmental conditions exist that may allow small-cell operation to interfere with larger system operation.

Where environmental conditions exist such that the signal strength detected by the larger system is of an insufficient level, then frequency sharing is inappropriate. In one embodiment of the invention the larger system reserves communication resources for weak signal operation. The reserved resources (weak-signal resources) are communication resources that are not shared with the small-cell systems and are reserved for those communication units which exhibit weak signal conditions during resource request.

The large system measures the signal strength of received resource requests as well as on-going transmissions of communication units. Where the transmitted signal of a resource request is measured to be of a poor signal quality then a weak-signal resource is allocated.

Reserving a set of communication resources within the large trunked system for weak-signal requestors reduces the potential for interference between requestors on the large cell system and the small-cell system. Assignment of a communication unit to a weak-signal resource effectively isolates communication units vulnerable to interference. Isolating communication units vulnerable to interference enhances system operation by ensuring that a weak-signal requestor has exclusive use of a communication resource.

Where the signal quality of a communication unit is initially measured to be of adequate quality and a shared resource is allocated, and then deteriorates, small-cell communication units are required to vacate the resource. The larger system communicates the value of the measured signal to the small-cell system. The small-cell base site uses this value and a control algorithm to control its own resource allocation. Where a small-cell communication unit is required to vacate a resource the re-allocation of another resource for the small-cell unit is processed on a priority basis.

The small-cell base site also performs a second signal measurement to determine relative proximity of the larger system mobile unit to the small-cell coverage area. The higher transmitting power of the mobile unit will interfere with small-cell operation if they are too close to one another. Both the signal quality and communication unit proximity values can be used to control resource allocation within the small-cell system.

Resource allocation within the small-cell system may also be based upon available but non-allocated resources within the trunked communication system. Resources not allocated within the trunked system (other than weak-signal resources) are always available for small-cell use. Resources not allocated within the trunked system, in fact, may be used simultaneously by more than one small-cell system operating within the service coverage area of the same, larger, trunked system.

BEST MODE FOR CARRYING OUT THE INVENTION

Figure 1:
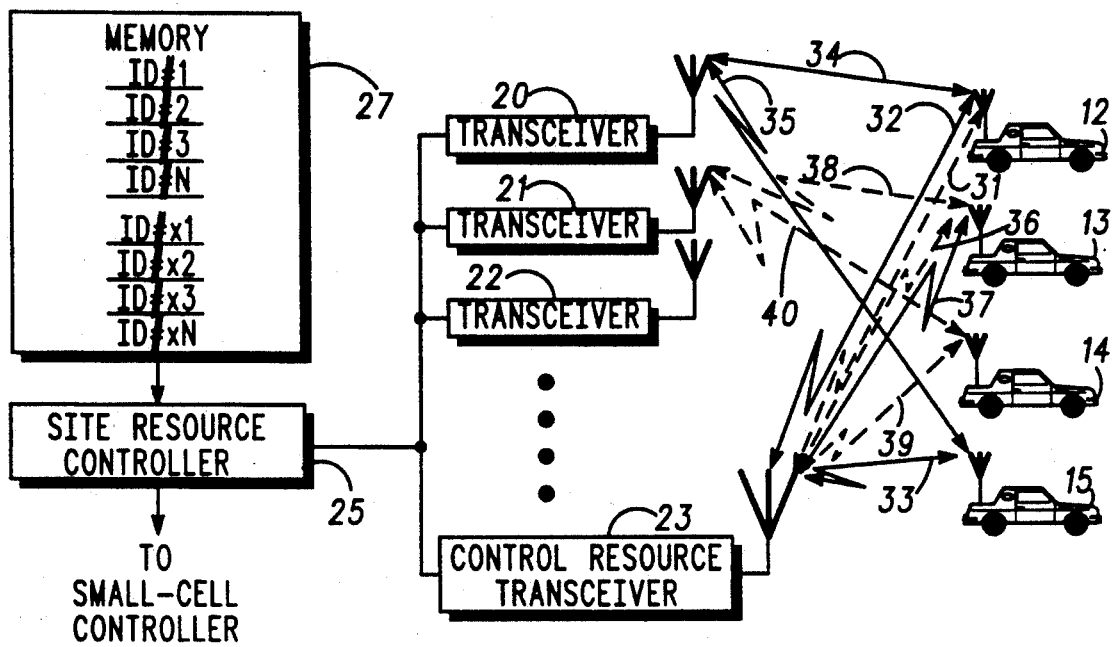
FIG. 1 comprises a block diagram of communication equipment within a single cell of a trunked communication system with two requesting communication units communicating with two target communication units.

A block diagram of equipment located within a single, large system cell of a trunked communication system is depicted (FIG. 1) generally by the number 10. The cell (10) generally includes a plurality of communication units (12 through 15) (as used herein "communication units" refers to mobile units, or portable units), repeaters (20 through 22), and a site resource controller (25) with an attached memory unit (27). The system also includes a control resource transceiver (23) to allow two-way transmission of system control information on the inbound and outbound frequencies of the frequency pair designated as the control resource.

Included within the control resource transceiver (23) are provisions for the measurement of signal strength of received resource requests. Repeaters (20 through 22) are also equipped for the periodic measuring of signals transmitted from communication units (12 through 15).

Also included within memory (27) are two lists of communication resources identifying frequency pairs used by the large system (10) (large cell communication resources). The first list is a compilation of resources (1−N) shared with small-cell systems. The second list is a list of weak-signal resources (X1-XN) reserved for those communication units transmitting under weak signal conditions.

In general, to establish a call between two communication units operating in such a cell (10) a requesting unit (12) sends a data packet called an inbound signalling word (ISW) (31) on the inbound frequency allocated to the control resource transceiver (23). The ISW (31) typically contains the requesting communication unit's unique ID code plus the ID number of the target party (or parties).

The control resource transceiver (23) receives the transmission (31), measures its signal strength, and transfers the received resource request and signal strength value to the resource controller (25). The site resource controller (25) decodes the request, and compares the signal strength value to a weak-signal threshold value. If the signal strength value exceeds the weak-signal threshold the resource controller (25) assigns the next available resource in the first list (1−N) contained within memory (27). If the signal strength value is below the weak-signal threshold then the resource controller (25) assigns the next available weak-signal resource from the second list (X1-XN) within memory (27).

The resource controller (25) then transmits on the control resource transceiver (23) an appropriate resource grant outbound signalling word (OSW) (32) to the requesting communication unit (12). The requesting communication unit's (12) frequency grant OSW (32) causes it to move to the designated transmit frequency. If the target party is another mobile communication unit (15) located within the same cell the resource controller at the same time also transmits an OSW (33) to the target unit identifying the receive frequency. When the requesting unit (12) initiates a voice transmission (34) the base site repeater (20) receives the transmission (34) and retransmits the voice signal on the receive frequency (35) to the target party (15).

If, after initiation of the conversation between the two mobile communication units (12 and 15), another communication unit (13) were to request service then the situation further shown in dotted lines in FIG. 1 would exist. FIG. 1 shows a requesting communication unit (13) transmitting an ISW (36) to the site resource controller and receiving an OSW (37) defining a frequency grant through another repeater (21). The target party (14) for the requesting communication unit (13) receives an OSW (39) defining a frequency grant. The requesting communication unit (13) and target (14) move to the designated frequency and begin transmitting and receiving on the assigned frequency (38) and (40).

Figure 2:
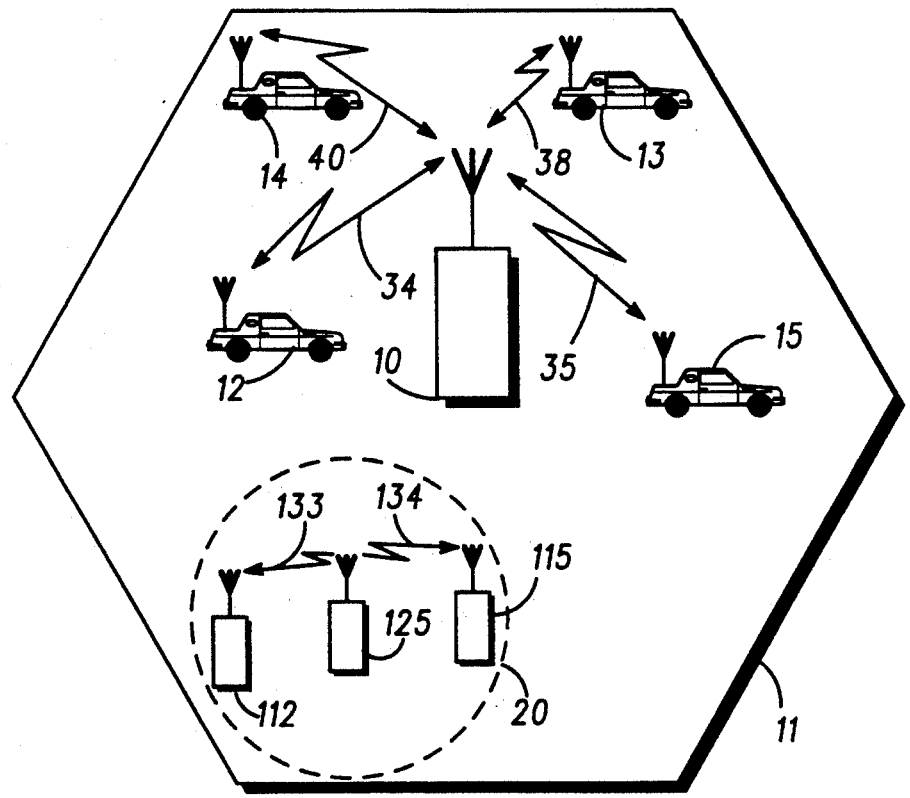
FIG. 2 depicts, in a geographical context, a single cell of a trunked communication system showing two requesting communication units communicating with two target communication units.

Shown in FIG. 2 is the situation substantially described in the previous example. The requesting communication unit (12) is shown to be at the edges of the service coverage area (11) of the cell (10). As shown, an ongoing conversation exists between the original two communication units (12 and 15). Also shown is the ongoing conversation between the second set of communication units (13 and 14). The second requesting communication unit (13) is shown to be in close proximity to the base site (10).

Since the requesting communication units (12) is transmitting from the edge of the service coverage area (11) it can be assumed, for purposes of this example, that the communication unit (12) has been allocated a weak-signal resource. Also, since the additional requesting communication unit (13) is shown in close proximity to the base site (10), it can be assumed that communication unit (13 and 14) are operating on a resource shared with the small cell system (125).

Pursuant to one embodiment of the invention, repeaters (or other dedicated receivers) at (or proximal to) the base sites are equipped for measuring the received signal strength from communication units. Where the received signal strength from nearby communication units (for example communication unit 13) exhibits sufficient strength, a control algorithm allows low-power small-cell communication systems located within the same cell to operate on certain shared frequencies.

A small-cell communication system (FIG. 3) has a similar functionality to the larger cellular system (10) but operates independently of the large cell system (10) at a substantially reduced power level. Small-cell communication units (112 through 115), small-cell repeaters (120 through 122), and the small-cell control resource transceiver (123) operate in the area of typically ten milliwatts. Repeaters within the small-cell system (120 through 122) are also equipped for the detection of control bits from authorized small-cell communication units.

A requesting small-cell communication unit (112) transmits an ISW (131) to and receives a frequency grant OSW (132) from a small-cell resource controller (125), all as described above. Two-way transmissions (133 and 134) between a requesting unit (112) and a target communication unit (115) also occurs substantially as described above. One contemplated difference, on the other hand, between the small-cell system and the trunked system is that in the small-cell system a requesting communication unit and any target communication units operate on a single frequency using time division multiplexing. Time division multiplexing in a small-cell system allows a requestor and a target to share a single frequency. The single frequency used by the small cell system (FIG. 3), in one embodiment of the invention, is a selected inbound frequency of a communication resource of the large system (10).

In one embodiment of the invention, a small-cell communication resource may be allocated to a single set of transmitting/receiving communication units. As such, a requesting small-cell communication unit may be assigned the first of two TDM slots on a small-cell communication resource and target units would occupy the second of two TDM slots.

The small-cell communication system shown (FIG. 3) is an example of such a system. The small-cell system shown (FIG. 3) contains a number of repeaters (120 to 122). The system shown (FIG. 3) is an example of a small-cell system capable of handling a number of simultaneous small-cell communication transactions.

Small-cell communication units, because of the reduced power levels, are constructed to transmit from a few feet to a few hundred feet to service communication needs within a limited geographic area such as a manufacturing facility, a shopping mall, or other commercial or residential facility.

Shown in FIG. 2 is a small-cell communication system having a service coverage area (20) operating within the previously described trunked communication system. Communication units (12 and 15), and (13 and 14) are engaged in two-way conversations supported by larger system infrastructure. The site resource controller (25) periodically measures a first signal quality factor (the signal strength) of all communication units transmitting (12 and 13) via larger system infrastructure and transfers the results of those measurements by wireline, or otherwise, to the small-cell communication controller (125).

In the example (FIG. 2) one communication unit (13) is approximately equidistant with the small-cell system (125) to the base site (25). Because of the approximate equidistant locations and the power level of the mobile being several orders magnitude larger than the small-cell system, simultaneous re-use of the resource (38) within the small-cell system (125) can occur without interference in reception of communication signals transmitted by the communication unit (13) at the base site.

The small-cell controller under these conditions may re-allocate the previously granted resource within the small-cell system. In FIG. 2 re-use of the resource (38) is shown in a conversation between small-cell units (112 and 115) over re-used communication resources (133 and 134). Different reference numbers (133, and 134) are used in the drawing (FIG. 2) for the communication resource (38) because the re-used communication resources (133 and 134) are time division multiplexed and the original communication resource (38) is not.

In some cases re-use of resources within the small-cell system may not be appropriate. One example of this is the control resource used by the resource controller in the large system. Another example is the previously mentioned situation where a communication unit is transmitting in the large system with a signal strength below a minimum threshold. A third example is a set of communication resources reserved by the large system for use by communication units with detected weak signals.

Figure 3:
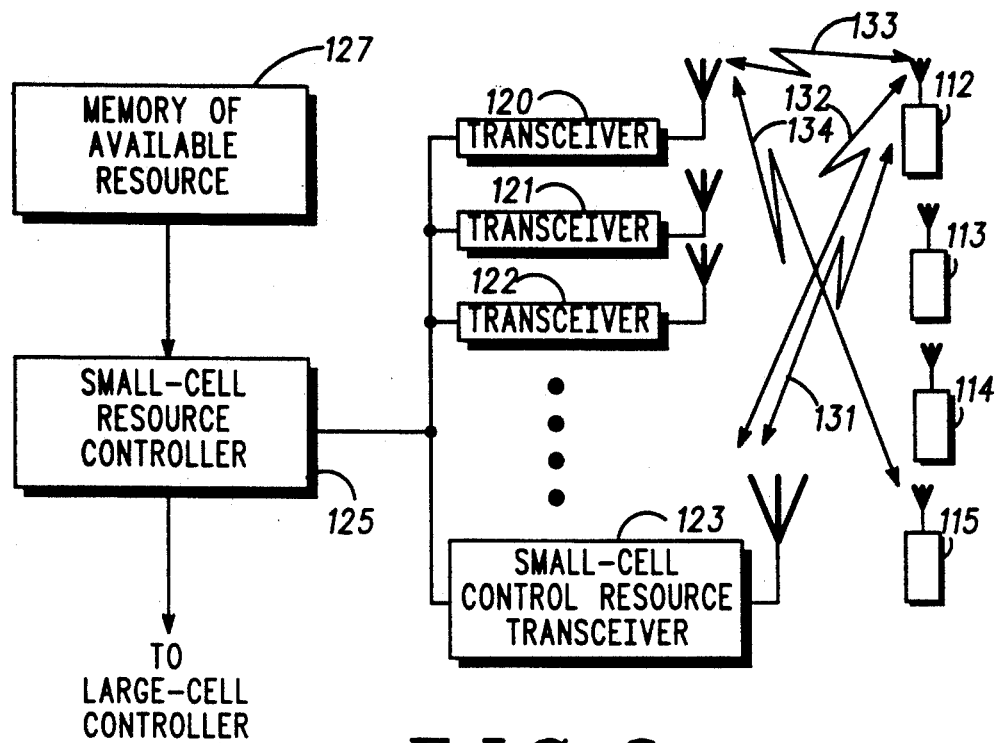
FIG. 3 comprises a block diagram of a single cell of a small-cell communication system.

To allow for the selective re-use of frequencies within the small-cell system a number of strategies are used. On start-up of the small-cell system the ID numbers of available communication resources are manually entered into a table of communication resources within a memory (FIG. 3, 127). Resources that are to be reserved for use by weak signal communication units are not entered into memory within the small-cell system. Resources that become unusable during normal operation because of weak signal conditions, or otherwise, are dynamically identified by entries into the table in memory (FIG. 3, 127) by the small-cell resource controller. In normal operation the small-cell resource controller allocates resources from the table sequentially from top to bottom, then from the top. Each time the small-cell resource controller receives a request for service the small-cell resource controller sequentially indexes down the table until an available resource is located.

The identification of communication resources available to the small-cell system begins with the periodic measurement of signal strength within each repeater (not operating on a weak-signal resource) in the large system by a received signal strength indicator (RSSI). The value of the RSSI is then transferred to a receiving means within the small-cell system. An indication of the actual value transferred in shown in the large cell flow chart (FIG. 4).

Figure 4:
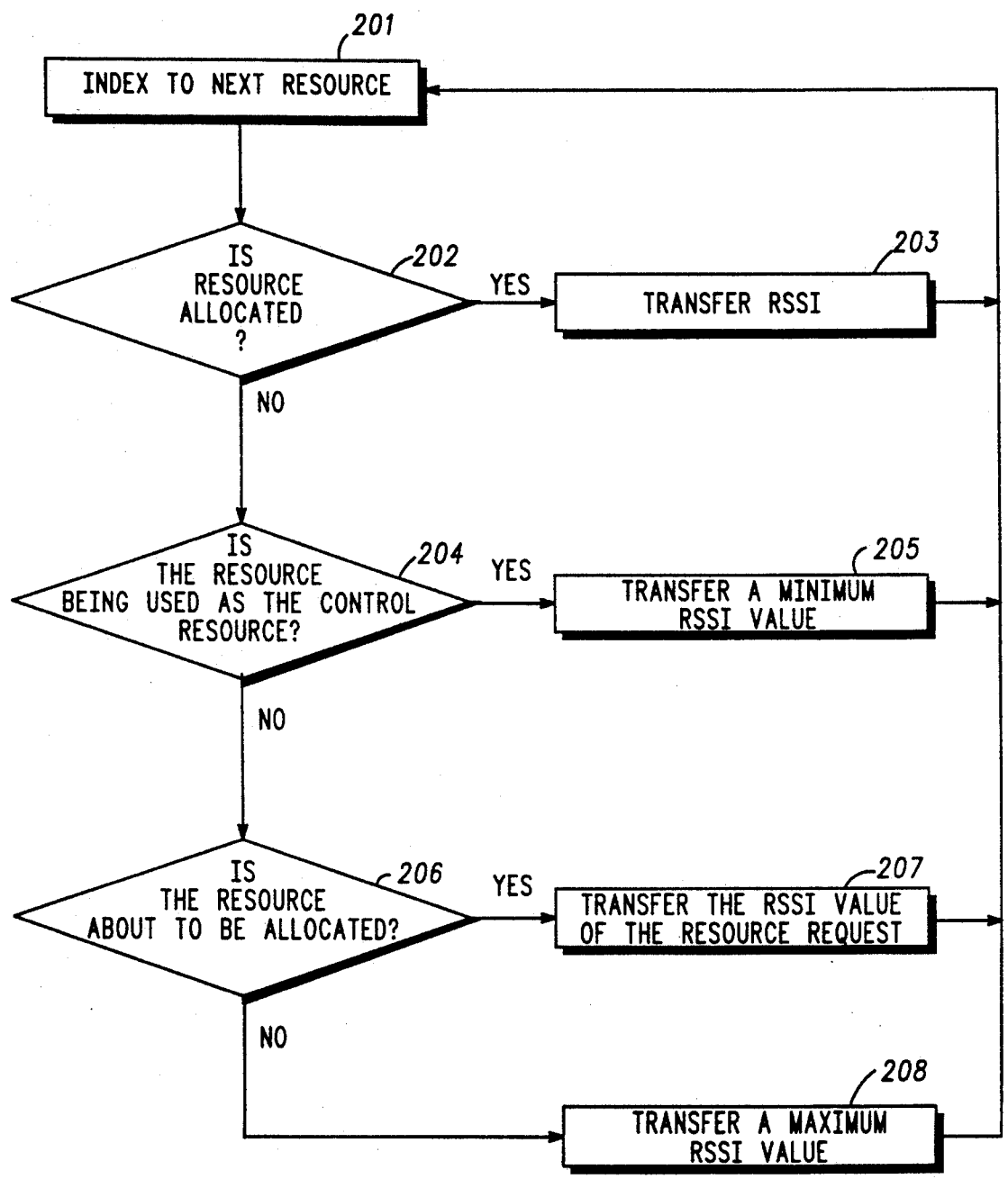
FIG. 4 comprises a flow chart for the transfer of signal quality factors from a large cell system to the small-cell system FIG. 5 comprises a flow chart for the determination of communication resources within the small-cell system.

As shown (FIG. 4), if the resource was previously allocated the measured signal strength value, RSSI, is transferred (FIG. 4, 202, 203). If, on the other hand, the resource is being used as a control resource, then a minimum value is transferred (FIG. 4, 204, 205). The minimum value is used to prevent operation on the resource by any unit within a small-cell system.

If a resource is about to be allocated (FIG. 4, 206) then the measured RSSI of the received ISW requesting service is transferred (FIG. 4, 207). If the communication resource is not being used by the large system (FIG. 4) (and the resource is not a weak-signal resource) then a maximum RSSI value is transferred (FIG. 4, 208) to the small-cell system. The maximum value indicates to the small-cell system that the resource may be used at will.

Figure 5:
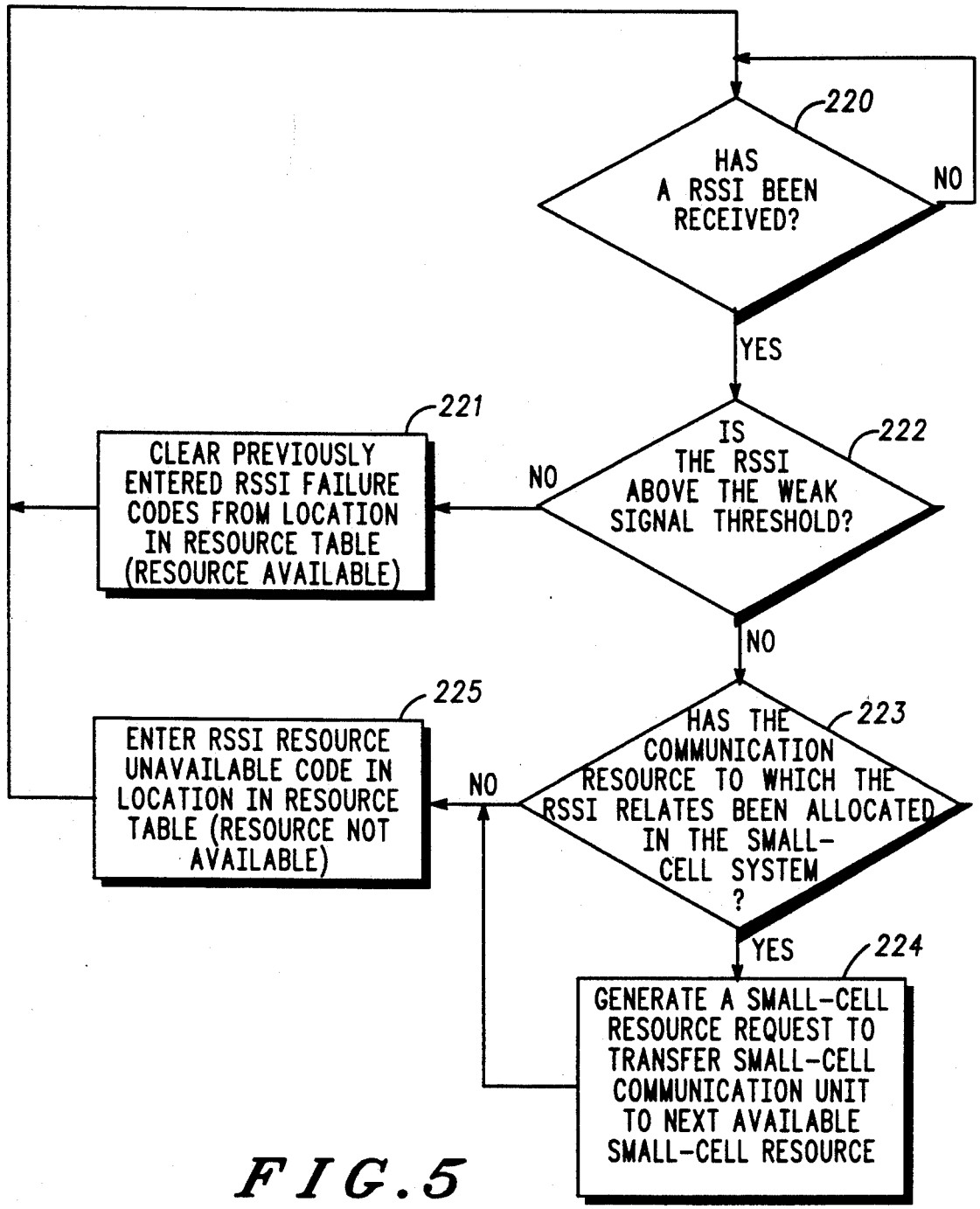

Upon receipt of the RSSI (FIG. 5, 220) by the resource controller in the small-cell system a determination of availability to the small-cell system is made. Shown (FIG. 5) is a flow chart of the process steps in determining small-cell availability. As shown, if the RSSI does not exceed the threshold value (FIG. 5, 222) then an entry (FIG. 5, 225) is made in the small-cell resource table precluding use within the small-cell system.

In another embodiment of the invention the second signal quality factor is considered relative to small-cell resource re-use. The second signal quality measurement is the signal strength of nearby large cell communication units measured at the small-cell site (small-cell RSSI). If the signal strength is above a second threshold then the resource is determined to be not available to the small-cell system.

The small-cell resource controller, independently and periodically, takes RSSI measurements on resources listed as available within the resource table. Resource listed as available but producing a small-cell RSSI above a second threshold are also determined to be unavailable within the small-cell system. Entry of such unavailability is then made in the resource table (in a manner similar to the flow chart shown in FIG. 5). When the small-cell RSSI has fallen below the second threshold then the above entry is cleared from the resource table.

Figure 6:
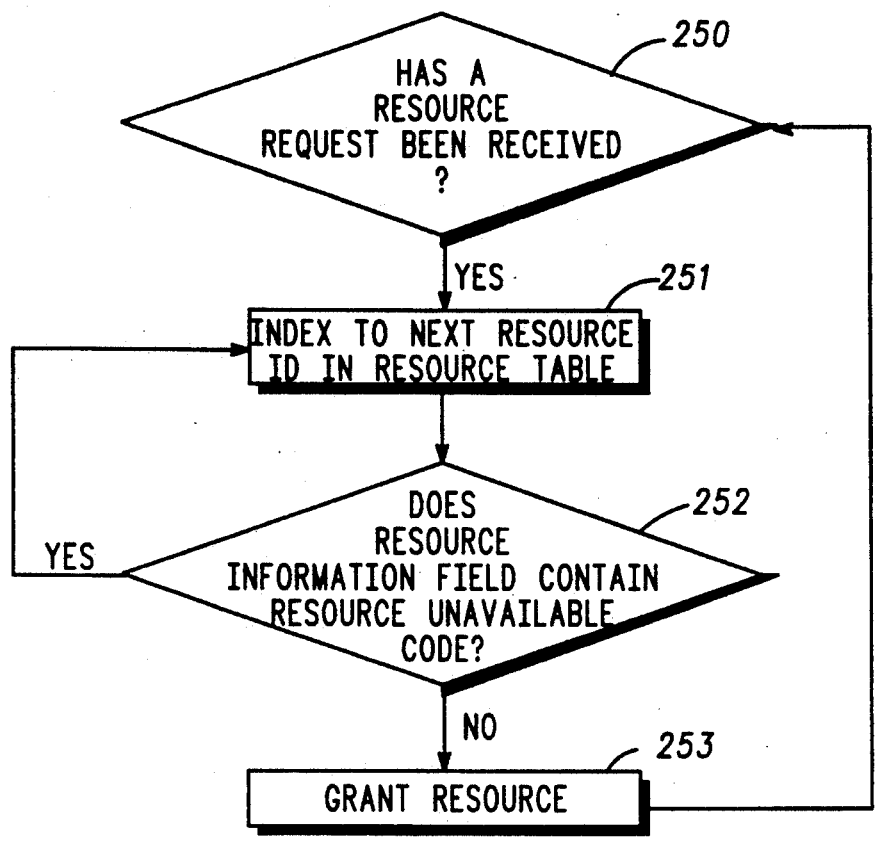
FIG. 6 comprises a flow chart for the allocation of communication resources within the small-cell system.

Shown (FIG. 6) is a flow chart for resource allocation within the small-cell resource controller. As shown, entry of a RSSI resource-unavailable code into the resource table results in the resource controller skipping that resource (FIG. 6, 252) upon detection of the entry of such failure code.

The control resource used by the small-cell controller is selected from the available resources within the resource table and which may be determined by the small-cell controller at random from the list of available resources. A preferred control resource may be entered upon start-up of the small-cell system.

Figure 7:
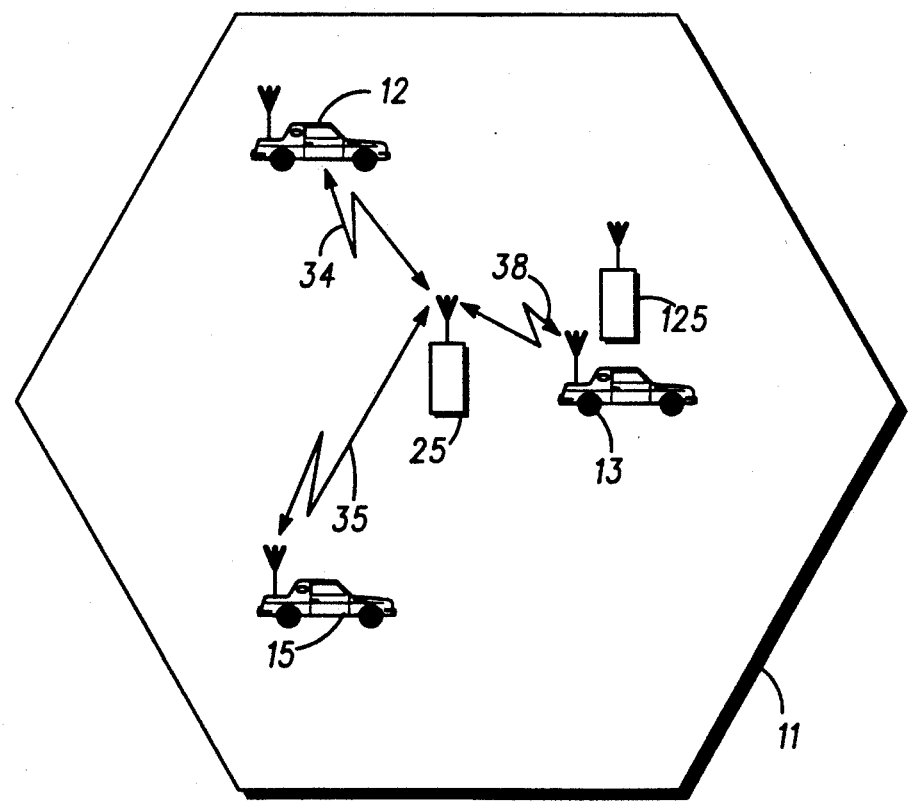
FIG. 7 comprises a block diagram of a single cell of a trunked communication system with a transmitting trunked communication unit approaching a small-cell communication system.

Disruption of small-cell signals may also occur over the small-cell control resource. The small-cell resource controller must also be on the alert for nearby trunked communication units on the small-cell control resource (FIG. 7). The small-cell resource controller measures the signal strength of received signals on its own control resource and, if an interfering signal is received, the small-cell resource controller must move to another available resource. If, after an inactive state, a small-cell communication unit then request service over the previously designated small-cell control resource, and doesn't receive a response, the small-cell communication unit then scans resources to identify the resource then being used by the small-cell resource controller.

Pursuant to another embodiment of the invention the trunked system resource controller is constructed to transmit a special OSW to any small-cell systems that may be present within the service coverage area of the trunked system. The OSW is periodically transmitted with an encoded list of allocated resources and the signal strengths measured over those resources. The transmission of the OSW eliminates the need for wireline landline connections between the trunked base site and small-cell base sites. Also transmitted, over a longer time period, is an OSW providing a list of communication resources allotted to the trunked system resource controller.

Figure 8:
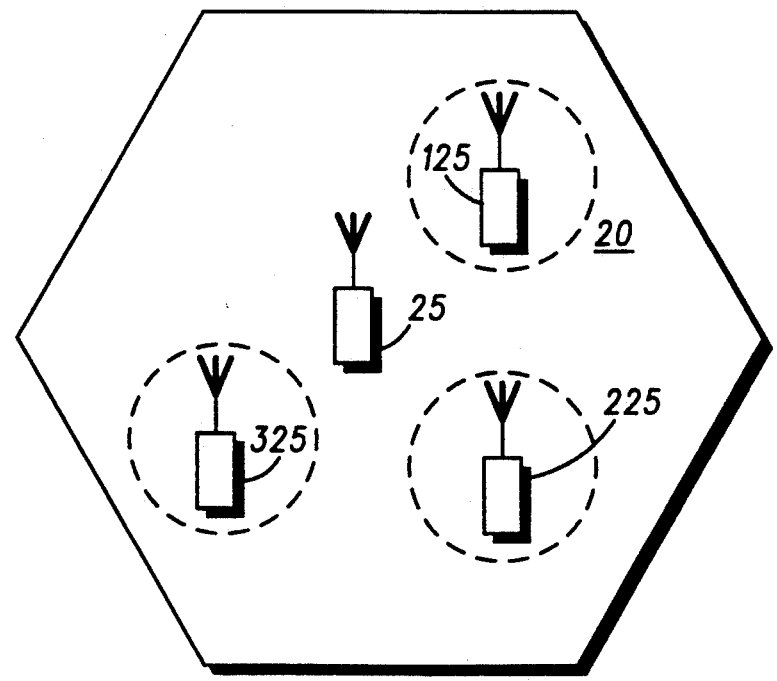
FIG. 8 comprises a block diagram of a single cell of a trunked communication system with a number of small-cell communication systems.

Pursuant to another embodiment of the invention a number of small-cell communication systems may be in operation in any instant within a given trunked communication system (FIG. 8). FIG. 8 shows a trunked resource controller (25) as well as a number of small-cell systems (125, 225, and 325). Each of the small-cell systems (125, 225, and 325) has a service coverage area. Because of the presence of other small-cell systems the resource controller of small-cell systems (125, 225, and 325) must not only scan for trunked communication units (12 through 15 in FIG. 1) but, also, for other nearby small-cell systems (125, 225, and 325) with overlapping service coverage areas. Because of the potential presence of other small-cell systems an algorithm must be present within each small-cell system to identify other small-cell systems and coordinate control of such systems in a manner least likely to interfere with nearby small-cell systems.

Pursuant to another embodiment of the invention the first signal quality measurements are performed by a stand-alone unit located in close proximity to the large cell base site. The stand-alone unit may be part of a small-cell system or group of small-cell systems. First signal quality factors are then transferred to the small-cell communication systems by wireline, or otherwise.

What is claimed is

1. A communication system within a service coverage area of a trunked communication system comprising:
    A. the trunked communication system having:
        i. a plurality of communications units;
        ii. a plurality of communication resources, each resource having a frequency pair;
        iii. at least one designated weak-signal resource of the plurality of communication resources;
        iv. at least one base site;
        v. means for allocating the plurality of communication resources;
        vi. means for measuring a first signal quality factor of at least one transmitting communication unit vii. means for comparing, the first signal quality factor on a control resource with a weak-signal threshold and when the weak-signal threshold exceeds the first signal quality factor, allocating the at least one weak-signal resource and, viii. means for transferring the first signal quality factor to an at least one small-cell receiving means;

B. at least one small-cell communication system, wherein the small-cell communication system has:

i. a plurality of small-cell communication units;

ii. at least one small-cell base site;

iii. means for measuring a second signal quality factor of at least one transmitting communication unit;

iv. means for receiving the first signal quality factor from the trunked communication system;

v. means for comparing the first signal quality factor with a first threshold value and the second signal quality factor with a second threshold value to produce a first result and a second result, respectively; and, vi. means for allocating an available small-cell communication resource based, at least in part, upon the first result and the second result to an at least one requesting small-cell communication unit.

2. The communication system in claim 1 wherein the means for transferring the measured quality factor is through the use of land lines.

3. The communication system in claim 1 wherein the means for transferring the measured quality factor is through the use of an OSW transmitted by the trunked communication system to the at least one small-cell communication system.

4. A method of assigning communication resources within a first service coverage area, wherein the first service coverage area is at least partially coextensive with a second service coverage area that is serviced by a first communication system that makes use of a first set of communication resources, comprising the steps of:

A) measuring, at a base site, for the first communication system a first signal quality factor on a control resource of the first set of communication resources;

B) comparing the first signal quality factor with a weak-signal threshold;

C) allocating a weak-signal resource of the first set of communication resources when the weak-signal threshold at least equals the first signal quality factor on the control resource;

D) measuring, proximal to the first communication system, a first signal quality factor for at least one large system allocated resource of the first set of communication resources;

E) measuring, within the first service coverage area, a second signal quality factor of the same at least one large system allocated resource of the first set of communication resources;

F) comparing the first and second signal quality factors against at least one reference value, to obtain first and second comparison values, respectively;

G) when the first and second comparison values at least equal predetermined values, determining that the at least one of the first set of communication resources is available for allocation within the first service coverage area.

5. The method of claim 4, wherein the first set of communication resources includes a plurality of frequency pairs.

6. The method of claim 5, wherein at least some of the plurality of frequency pairs each include an inbound communication resource and an outbound communication resource.

7. A method of reusing communication resources, by an independent, small cell communication system within a service coverage area of a larger, large cell, trunked communication system, such method comprising the steps of: comparing, by a small cell resource controller of the small cell system, an at least one large cell, signal quality factor of an operating frequency of an inbound large cell communication resource with a first threshold; when the signal quality factor exceeds the first threshold, allocating, by the small cell resource controller, the frequency to a small cell communication unit; measuring, by the small cell resource controller, the signal quality factors of communication resources allocated to small cell communication units; comparing, by the small cell resource controller, the signal quality factors, measured by the small cell resource controller, against a second threshold; and, deallocating communication resources from small cell communication units when the small cell measured signal quality factors exceeds the second threshold.

8. An apparatus for reusing communication resources, by an independent, small cell communication system within a service coverage area of a larger, large cell, trunked communication system, such apparatus comprising: means for comparing, by a small cell resource controller of the small cell system, an at least one large cell, signal quality factor of an operating frequency of an inbound large cell communication resource with a first threshold; when the signal quality factor exceeds the first threshold, allocating, by a means for allocating within the small cell resource controller, the frequency to a small cell communication unit; means for measuring by the small cell resource controller, the signal quality factors of communication resources allocated to small cell communication units; means for comparing, by the small cell resource controller, the signal quality factors, measured by the small cell resource controller, against a second threshold; and, means for deallocating communication resources from small cell communication units when the small cell measured signal quality factors exceeds the second threshold.

* * * * *